(12) United States Patent
Gallucci et al.

(10) Patent No.: US 8,466,249 B2
(45) Date of Patent: Jun. 18, 2013

(54) CLEAR SILICONE POLYCARBONATE ELASTOMERIC COPOLYMERS

(75) Inventors: Robert R. Gallucci, Mt. Vernon, IL (US); James Franklin Hoover, Evansville, IL (US); Paul Dean Sybert, Evansville, IL (US)

(73) Assignee: SABIC Innovative Plastics IP BV, Bergen op Zoom (NL)

( * ) Notice: Subject to any disclaimer, the term of this patent is extended or adjusted under 35 U.S.C. 154(b) by 0 days.

(21) Appl. No.: 13/107,046

(22) Filed: May 13, 2011

(65) Prior Publication Data

US 2012/0288654 A1    Nov. 15, 2012

(51) Int. Cl.
*C08G 77/448* (2006.01)

(52) U.S. Cl.
USPC ............................ 528/29; 528/125; 528/196

(58) Field of Classification Search
None
See application file for complete search history.

(56) References Cited

U.S. PATENT DOCUMENTS

| 3,189,662 | A | * | 6/1965 | Vaughn, Jr. ................... 528/33 |
| 5,451,632 | A | | 9/1995 | Okumura et al. |
| 5,510,414 | A | * | 4/1996 | Okamoto et al. ............. 524/494 |
| 5,530,083 | A | | 6/1996 | Phelps et al. |
| 6,723,864 | B2 | | 4/2004 | Silva et al. |
| 6,833,422 | B2 | | 12/2004 | Silva et al. |
| 6,870,013 | B2 | | 3/2005 | Silva et al. |
| 6,930,194 | B2 | | 8/2005 | Silva et al. |
| 7,232,865 | B2 | | 6/2007 | DeRudder et al. |
| 7,888,447 | B2 | | 2/2011 | Dhara et al. |
| 2004/0220330 | A1 | | 11/2004 | DeRudder et al. |
| 2007/0238846 | A1 | | 10/2007 | Davis et al. |
| 2008/0081893 | A1 | | 4/2008 | Hoover et al. |

OTHER PUBLICATIONS

International Search Report for PCT/US2012/036079 mailed Jul. 27, 2012.

* cited by examiner

*Primary Examiner* — Marc Zimmer
(74) *Attorney, Agent, or Firm* — Richard M. Klein; Fay Sharpe LLP

(57) ABSTRACT

Silicone polycarbonate block copolymers are disclosed that have a high elongation before yield, are clear, and have elastomeric properties. Generally, the silicone blocks are very short (less than about 50 organosiloxane repeat units) and the silicone blocks are substantially isolated from each other by bisphenol carbonate spacers.

3 Claims, No Drawings

CLEAR SILICONE POLYCARBONATE ELASTOMERIC COPOLYMERS

BACKGROUND

The present disclosure relates to transparent block copolymers formed from polycarbonate blocks and silicone blocks. These block copolymers have a high elongation before yield and other desirable mechanical properties.

Polycarbonates (PC) are synthetic engineering thermoplastic resins derived from bisphenols and phosgene, or their derivatives. They are linear polyesters of carbonic acid and can be formed from dihydroxy compounds and carbonate diesters, or by ester interchange. Polycarbonates are a useful class of polymers having many desired properties, such as optical clarity, good impact strength, and higher heat distortion temperature (HDT).

Conventional silicone polycarbonate block copolymers have been recognized for their ductility/impact strength at low temperatures and flame retardance. However, said silicone block copolymers have been found to exhibit an undesirable attribute, low transparency and high degrees of haze, which is problematic for some end-uses of the material and limits the nucleus of uses for said resins. It would also be desirable to obtain a silicone polycarbonate block copolymer that exhibits elastomeric behavior, or in other words can be stretched and return to its original shape without permanent deformation coupled with an acceptable transparency.

BRIEF DESCRIPTION

The present disclosure relates to silicone polycarbonate elastomeric copolymers which exhibit a combination of elastomeric behavior and clarity. The compositions also have good mechanical properties, such as hardness, and have many useful applications such as various consumer products, medical devices, industrial parts, etc.

The present disclosure provides for one or more silicone polycarbonate elastomeric block copolymers prepared by the reaction of: at least one difunctional phenolic terminated polydiorganosiloxane having from 5 to 50 siloxane repeat units, at least one bisphenol containing from 6 to 36 carbon atoms, and a carbonate precursor. Less than 20% of the carbonate linkages formed by the carbonate precursor are between phenolic terminated polydiorganosiloxanes, as determined by $^{13}$C NMR. The block copolymer has at least 30% elongation before yield as measured by ASTM D638.

The phenolic terminated polydiorganosiloxane may have the structure of Formula (15):

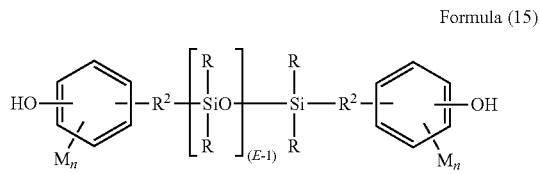

Formula (15)

wherein E is from 5 to 50; each R is independently a $C_{1-13}$ monovalent organic group; each $R^2$ is independently a divalent $C_{2-8}$ aliphatic or aromatic group or combination thereof; each M is independently halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy; and each n is independently 0, 1, 2, 3, or 4.

Alternatively, the phenolic terminated dimethylsiloxane may have the structure of Formula (12):

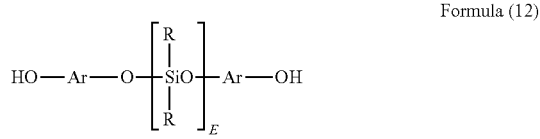

Formula (12)

where E is from 5 to 50; R is a methyl group; and Ar is $C_{6-30}$ arylene.

The bisphenol may have the structure of Formula (3):

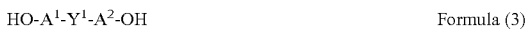

HO-$A^1$-$Y^1$-$A^2$-OH          Formula (3)

wherein $A^1$ and $A^2$ are independently a monocyclic divalent aryl group, and Y is a bridging group having one or two atoms that separate $A^1$ from $A^2$.

The blocks formed from the diphenolic phenolic terminated polydiorganosiloxane may make up from 60 wt % to 80 wt % of the block copolymer. In a further embodiment, the blocks formed from the difunctional phenolic terminated polydiorganosiloxane make up from 60 wt % to 80 wt % of the block copolymer, and the length of each silicone block is from 10 to 40 silicone units. In yet another embodiment, the blocks formed from the bisphenol may make up 10 wt % to 50 wt % of the block copolymer. In another embodiment, less than 10% of the carbonate linkages formed by the carbonate precursor are between phenolic terminated polydiorganosiloxanes, as determined by $^{13}$C NMR.

The block copolymer may have a percent transmission (% T) of 60% or greater, and a haze level (% H) of 20% or less, when measured at 1.0 mm thickness according to ASTM D1003. The block copolymer could have a Shore D hardness of from 5 to 30 as measured by ASTM D2240. The block copolymer may have a weight average molecular weight of from about 10,000 to about 100,000. The block copolymer may have one or more of the haze, Shore D hardness, and molecular weight values as stated above.

In another embodiment, the block copolymer has a % T of 70% or greater, and a haze level of 10% or less, when measured at 1.0 mm thickness according to ASTM D1003; a yellowness index (YI) of 10 or less, when measured according to ASTM D6290; and a Shore D hardness of from 5 to 20 as measured by ASTM D2240.

Also disclosed is a silicone polycarbonate elastomeric block copolymer comprising silicone blocks and polycarbonate blocks. Each silicone block is formed from the polymerization of at least one difunctional phenolic terminated polydiorganosiloxane with a carbonate precursor. Each polycarbonate block is formed from the polymerization of a dihydroxy aromatic compound with a carbonate precursor. In some instances, less than 10 percent of the silicone blocks formed from said reaction of said polydiorganosiloxane with a carbonate precursor are attached to another silicone block formed from said reaction of said polydiorganosiloxane with a carbonate precursor, as determined by $^{13}$C NMR.

The block copolymer may have at least 30% percent elongation before yield as measured by ASTM D638. The block copolymer may have a % T of 60% or greater, and a haze level of 20% or less, when measured at 1.0 mm thickness according to ASTM D1003. The block copolymer may have a yellowness index of 10 or less, including from 2 to 6, when measured according to ASTM D6290. The block copolymer may have a Shore D hardness of from 5 to 30 as measured by ASTM D2240. The block copolymer may have a weight average molecular weight of from about 10,000 to about 100,000. The block copolymer may have any one, or a combination of, these properties.

In particular embodiments, the polycarbonate blocks have from 10 to 45 repeating units having the structure of Formula (II):

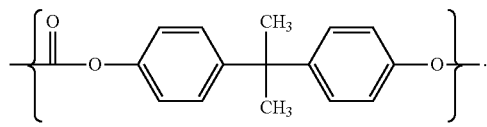

Formula (II)

In some embodiments, the silicone blocks have the structure of Formula (IV):

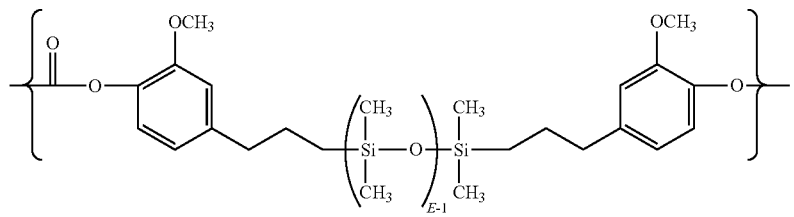

Formula (IV)

wherein E is from 30 to 50.

In still other embodiments, the silicone blocks have the structure of Formula (V):

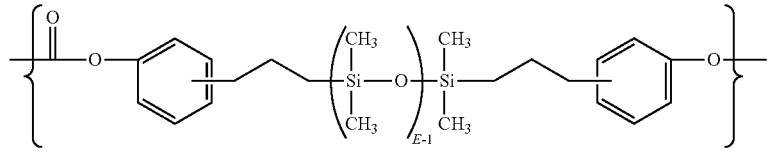

Formula (V)

wherein E is from 30 to 50.

In other embodiments, the silicone blocks have an average value of from 10 to 45 silicone units.

The silicone blocks may have a glass transition temperature of from about minus 130° C. to about minus 50° C. The polycarbonate blocks may have a glass transition temperature greater than 70° C.

Also disclosed is a silicone polycarbonate elastomeric block copolymer prepared by the reaction of: 60 to 70 weight percent of at least one difunctional phenolic terminated polydiorganosiloxane having from 30 to 50 organosiloxane repeat units, 30 to 40 weight percent of at least one bisphenol containing from 6 to 36 carbon atoms, and a carbonate precursor. Less than 10% of the carbonate linkages formed by the carbonate precursor are between phenolic terminated polydiorganosiloxanes as determined by $^{13}$C NMR. The block copolymer has at least 30% elongation before yield as measured by ASTM D638; a % T of 70% or greater, and a haze level of 10% or less, when measured at 1.0 mm thickness according to ASTM D1003; a yellowness index of 10 or less, when measured according to ASTM D6290; and a Shore D hardness of from 5 to 20 as measured by ASTM D2240.

Also disclosed is a silicone polycarbonate elastomeric block copolymer prepared by the reaction of: 50 to 90 weight percent of at least one difunctional phenolic terminated polydiorganosiloxane having from 5 to 50 organosiloxane repeat units, 10 to 50 weight percent of tetrabromo bisphenol-A; and a carbonate precursor. Less than 20% of the carbonate linkages formed by the carbonate precursor are between phenolic terminated polydiorganosiloxanes as determined by $^{13}$C NMR. The block copolymer has at least 30% elongation before yield as measured by ASTM D638.

The block copolymers described above may be incorporated into an article selected from the group consisting of flexible tubing, a handle, a push button, a belt, a connector, a wire coating, an insulator, a bladder, foot wear, a cushion, a membrane, a medical device, a protective device, eyewear, and lenses.

These and other non-limiting characteristics are more particularly described below.

DETAILED DESCRIPTION

The present disclosure may be understood more readily by reference to the following detailed description and the examples included therein. In the following specification and the claims that follow, reference will be made to a number of terms which shall be defined to have the following meanings.

The singular forms "a," "an," and "the" include plural referents unless the context clearly dictates otherwise.

As used in the specification and in the claims, the term "comprising" may include the embodiments "consisting of" and "consisting essentially of."

Numerical values in the specification and claims of this application, particularly as they relate to polymers or polymer compositions, reflect average values for a composition that may contain individual polymers of different characteristics. Furthermore, unless indicated to the contrary, the numerical values should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 grams to 10 grams" is inclusive of the endpoints, 2 grams and 10 grams, and all the intermediate values). The endpoints of the ranges and any values disclosed herein are not limited to the precise range or value; they are sufficiently imprecise to include values approximating these ranges and/or values.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. In at least some instances, the approximating language may correspond to the precision of an instrument for measuring the value. The modifier "about" should also be considered as disclosing the range defined by the absolute values of the two endpoints. For example, the expression "from about 2 to about 4" also discloses the range "from 2 to 4."

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "aliphatic" refers to a linear or branched array of atoms that is not cyclic and has a valence of at least one. Aliphatic groups are defined to comprise at least one carbon atom. The array of atoms may include heteroatoms such as nitrogen, sulfur, silicon, selenium and oxygen in the backbone or may be composed exclusively of carbon and hydrogen. Aliphatic groups may be substituted or unsubstituted. Exemplary aliphatic groups include, but are not limited to, methyl, ethyl, isopropyl, isobutyl, hydroxymethyl (—CH$_2$OH), mercaptomethyl (—CH$_2$SH), methoxy, methoxycarbonyl (CH$_3$OCO—), nitromethyl (—CH$_2$NO$_2$), and thiocarbonyl.

The term "aromatic" refers to an array of atoms having a valence of at least one and comprising at least one aromatic group. The aromatic group may be substituted or unsubstituted. Exemplary aromatic groups include, but are not limited to, phenyl, pyridyl, furanyl, thienyl, naphthyl and biphenyl.

The term "cycloaliphatic" refers to an array of atoms which is cyclic but which is not aromatic. The cycloaliphatic group may include heteroatoms such as nitrogen, sulfur, selenium, silicon and oxygen in the ring, or may be composed exclusively of carbon and hydrogen. A cycloaliphatic group may be substituted or unsubstituted. Exemplary cycloaliphatic groups include, but are not limited to, cyclopropyl, cyclobutyl, 1,1,4,4-tetramethylcyclobutyl, piperidinyl, and 2,2,6,6-tetramethylpiperidinyl.

The term "alkyl" refers to a linear or branched array of atoms that is composed exclusively of carbon and hydrogen. The array of atoms may include single bonds, double bonds, or triple bonds (typically referred to as alkane, alkene, or alkyne). Alkyl groups may be substituted (i.e. one or more hydrogen atoms is replaced with another functional group) or unsubstituted. Exemplary alkyl groups include, but are not limited to, methyl, ethyl, and isopropyl.

The term "cycloalkyl" refers to an array of atoms which is cyclic but is not aromatic, and which is composed exclusively of carbon and hydrogen. Cycloalkyl groups may be substituted or unsubstituted.

The term "alkenyl" refers to a linear or branched array of atoms that is composed exclusively of carbon and hydrogen, and contains at least one carbon-carbon double bond. The alkenyl group may be substituted or unsubstituted.

The term "aryl" refers to an array of atoms which is aromatic and which is composed exclusively of carbon and hydrogen. Aryl groups may be substituted or unsubstituted. Exemplary aryl groups include phenyl, tolyl, and dibromohydroxyphenyl.

The term "alkylene" refers to an alkyl group having a valence of two.

The term "arylene" refers to an aryl group having a valence of two.

The term "alkoxy" refers to an array of the structure —OR, wherein R is alkyl.

The term "acyl" refers to an array of the structure —C(O)R, wherein R is alkyl.

The term "hydrocarbon" and "hydrocarbyl" refer to an array of atoms composed exclusively of carbon and hydrogen.

A block copolymer is formed from two or more different monomer blocks joined together to form the backbone of the polymer. When only two blocks are present, the block copolymer is called a diblock copolymer. Structures A and B provide two illustrations of block copolymer made from silicone blocks S and polycarbonate blocks C:

   Structure A

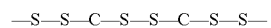   Structure B

The present disclosure permits the manufacture of silicone polycarbonate block copolymers that exhibit elastomeric behavior, have high clarity, and can contain up to 90 weight percent of silicone blocks. It should be noted that silicone polycarbonate block copolymers may also be referred to as polycarbonate-polysiloxane copolymers.

Without being bound by theory, it is believed that by preventing/reducing the linkage of silicone blocks to each other, phase separation can be decreased in the resulting block copolymer, thus reducing or preventing the haze or opacity of the resulting block copolymer. For higher clarity and less haze, copolymers of Structure A are preferred. This is especially important in the case of where the silicone block length exceeds 20 to 40 units. Put another way, it is believed that the block copolymers of the present disclosure are generally similar to Structure A, where only one S block is located between C blocks, and less like Structure B, having multiple S blocks between C blocks. Multiple C blocks can be present between S blocks. Combinations of Structure A and Structure B may also exist.

The terms "haze" or "% H" refers to the percentage of transmitted light that in passing through the specimen deviates from the incident beam by forward scattering, as defined in ASTM D1003. The term "percent transmission" or "% T" refers to the ratio of transmitted light to incident light, as defined in ASTM D1003. Clarity and haze are related because the lower the haze the higher the clarity.

The silicone polycarbonate block copolymers of the present disclosure are made up of polycarbonate blocks and silicone blocks. As used herein, the term "polycarbonate" refers to compositions having repeating structural carbonate units of the Formula (1):

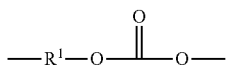
(1)

in which at least about 60 percent of the total number of $R^1$ groups are aromatic organic groups and the balance thereof are aliphatic, cycloaliphatic, or aromatic groups. In one embodiment, each $R^1$ is an aromatic organic group, for example a group of the Formula (2):

$$-A^1-Y^1-A^2-$$ (2)

wherein each of $A^1$ and $A^2$ is a monocyclic divalent aryl group and $Y^1$ is a bridging group having one or two atoms that separate $A^1$ from $A^2$. In an exemplary embodiment, one atom separates $A^1$ from $A^2$, with illustrative examples of such groups including —O—, —S—, —S(O)—, —S(O)$_2$—, —C(O)—, methylene, cyclohexyl-methylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ may be a hydrocarbon group or a saturated hydrocarbon group such as methylene, cyclohexylidene, or isopropylidene.

Polycarbonates may be produced by the interfacial reaction of dihydroxy compounds having the formula HO—$R^1$—OH, which includes bisphenol compounds of Formula (3):

$$HO-A^1-Y^1-A^2-OH$$ (3)

wherein $Y^1$, $A^1$ and $A^2$ are as described above. Included are bisphenol compounds of general Formula (4):

(4)

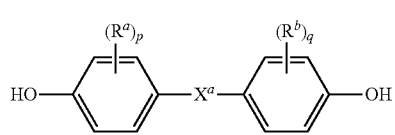
(5)

wherein $R^a$ and $R^b$ each represent a halogen atom or a monovalent hydrocarbon group and may be the same or different; p and q are each independently integers of 0 to 4; and $X^a$ represents one of the groups of Formula (5):

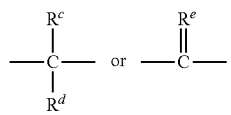

wherein $R^c$ and $R^d$ each independently represent a hydrogen atom or a monovalent linear alkyl or cyclic alkylene group and $R^e$ is a divalent hydrocarbon group. In an embodiment, $R^c$ and $R^d$ represent a cyclic alkylene group; or a heteroatom-containing cyclic alkylene group comprising carbon atoms and heteroatoms with a valency of two or greater. In an embodiment, a heteroatom-containing cyclic alkylene group comprises at least one heteroatom with a valency of 2 or greater, and at least two carbon atoms. Suitable heteroatoms for use in the heteroatom-containing cyclic alkylene group include —O—, —S—, and —N(Z)—, where Z is a substituent group selected from hydrogen, $C_{1-12}$ alkyl, $C_{1-12}$ alkoxy, or $C_{1-12}$ acyl. Where present, the cyclic alkylene group or heteroatom-containing cyclic alkylene group may have 3 to 20 atoms, and may be a single saturated or unsaturated ring, or fused polycyclic ring system wherein the fused rings are saturated, unsaturated, or aromatic.

Other bisphenols containing substituted or unsubstituted cyclohexane units can be used, for example bisphenols of Formula (6):

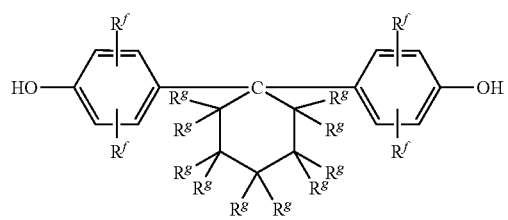
(6)

wherein each $R^f$ is independently hydrogen, $C_{1-12}$ alkyl, or halogen; and each $R^g$ is independently hydrogen or $C_{1-12}$ alkyl. The substituents may be aliphatic or aromatic, straight-chain, cyclic, bicyclic, branched, saturated, or unsaturated. Such cyclohexane-containing bisphenols, for example the reaction product of two moles of a phenol with one mole of a hydrogenated isophorone, are useful for making polycarbonate polymers with high glass transition temperatures and high heat distortion temperatures. Cyclohexyl bisphenol containing polycarbonates, or a combination comprising at least one of the foregoing with other bisphenol polycarbonates, are supplied by Bayer Co. under the APEC® trade name.

Other useful dihydroxy compounds having the formula HO—$R^1$—OH include aromatic dihydroxy compounds of Formula (7):

(7)

wherein each $R^h$ is independently a halogen atom, a $C_{1-10}$ hydrocarbyl such as a $C_{1-10}$ alkyl group, a halogen substituted $C_{1-10}$ hydrocarbyl such as a halogen-substituted $C_{1-10}$ alkyl group, and n is 0 to 4. The halogen is usually bromine.

Some exemplary dihydroxy compounds include: 4,4'-dihydroxybiphenyl, 1,6-dihydroxynaphthalene, 2,6-dihydroxynaphthalene, bis(4-hydroxyphenyl)methane, bis(4-hydroxyphenyl)diphenylmethane, bis(4-hydroxyphenyl)-1-naphthylmethane, 1,2-bis(4-hydroxyphenyl)ethane, 1,1-bis(4-hydroxyphenyl)-1-phenylethane, 2-(4-hydroxyphenyl)-2-(3-hydroxyphenyl)propane, bis(4-hydroxyphenyl) phenylmethane, 2,2-bis(4-hydroxy-3-bromophenyl) propane, 1,1-bis (hydroxyphenyl)cyclopentane, 1,1-bis(4-hydroxyphenyl)cyclohexane, 1,1-bis(4-hydroxyphenyl) isobutene, 1,1-bis(4-hydroxyphenyl)cyclododecane, trans-2,3-bis(4-hydroxyphenyl)-2-butene, 2,2-bis(4-hydroxyphenyl)adamantine, alpha, alpha'-bis(4-hydroxyphenyl)toluene, bis(4-hydroxyphenyl)acetonitrile, 2,2-bis(3-methyl-4-hydroxyphenyl)propane, 2,2-bis(3-ethyl-4-hydroxyphenyl)propane, 2,2-bis(3-n-propyl-4-hydroxyphenyl)propane, 2,2-bis(3-isopropyl-4-hydroxyphenyl)propane, 2,2-bis(3-sec-butyl-4-hydroxyphenyl)propane, 2,2-bis(3-t-butyl-4-hydroxyphenyl)propane, 2,2-bis(3-cyclohexyl-4-hydroxyphenyl)propane, 2,2-bis(3-allyl-4-hydroxyphenyl)propane, 2,2-bis(3-methoxy-4-hydroxyphenyl) propane, 2,2-bis(4-hydroxyphenyl)hexafluoropropane, 1,1- dichloro-2,2-bis(4-hydroxyphenyl)ethylene, 1,1-dibromo-2,2-bis(4-hydroxyphenyl)ethylene, 1,1-dichloro-2,2-bis(5-phenoxy-4-hydroxyphenyl)ethylene, 4,4'-dihydroxybenzophenone, 3,3-bis(4-hydroxyphenyl)-2-butanone, 1,6-bis(4-hydroxyphenyl)-1,6-hexanedione, ethylene glycol bis(4-hydroxyphenyl)ether, bis(4-hydroxyphenyl)ether, bis(4-hydroxyphenyl)sulfide, bis(4-hydroxyphenyl)sulfoxide, bis(4-hydroxyphenyl)sulfone, 9,9-bis(4-hydroxyphenyl)fluorine, 2,7-dihydroxypyrene, 6,6'-dihydroxy-3,3,3',3'-tetramethylspiro(bis)indane ("spirobiindane bisphenol"), 3,3-bis(4-hydroxyphenyl)phthalide, 2,6-dihydroxydibenzo-p-dioxin, 2,6-dihydroxythianthrene, 2,7-dihydroxyphenoxathin, 2,7-dihydroxy-9,10-dimethylphenazine, 3,6-dihydroxydibenzofuran, 3,6-dihydroxydibenzothiophene, and 2,7-dihydroxycarbazole, resorcinol, substituted resorcinol compounds such as 5-methyl resorcinol, 5-ethyl resorcinol, 5-propyl resorcinol, 5-butyl resorcinol, 5-t-butyl resorcinol, 5-phenyl resorcinol, 5-cumyl resorcinol, 2,4,5,6-tetrafluoro resorcinol, 2,4,5,6-tetrabromo resorcinol, or the like; catechol; hydroquinone; substituted hydroquinones such as 2-methyl hydroquinone, 2-ethyl hydroquinone, 2-propyl hydroquinone, 2-butyl hydroquinone, 2-t-butyl hydroquinone, 2-phenyl hydroquinone, 2-cumyl hydroquinone, 2,3,5,6-tetramethyl hydroquinone, 2,3,5,6-tetra-t-butyl hydroquinone, 2,3,5,6-tetrafluoro hydroquinone, 2,3,5,6-tetrabromo hydroquinone, and the like, as well as combinations comprising at least one of the foregoing dihydroxy compounds.

Specific examples of bisphenol compounds that may be represented by Formula (3) include 1,1-bis(4-hydroxyphenyl)methane, 1,1-bis(4-hydroxyphenyl)ethane, 2,2-bis(4-hydroxyphenyl)propane (hereinafter "bisphenol-A" or "BPA"), 2,2-bis(3,5-dibromo-4-hydroxyphenyl)propane ("tetrabromo bisphenol-A"), 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxy-t-butylphenyl)propane, 3,3-bis(4-hydroxyphenyl)phthalimidine, 2-phenyl-3,3-bis(4-hydroxyphenyl)phthalimidine (PPPBP), and 1,1-bis(4-hydroxy-3-methylphenyl)cyclohexane (DMBPC). Combinations comprising at least one of the foregoing dihydroxy compounds may also be used.

The term "polycarbonate" also refers to compositions which are homopolycarbonates, copolymers comprising different $R^1$ moieties in the carbonate (referred to herein as "copolycarbonates"), and copolymers comprising carbonate units with other types of polymer units, such as ester units. A specific type of copolymer contemplated herein is a polyester carbonate, also known as a polyester-polycarbonate. Such copolymers further contain, in addition to recurring carbonate chain units of the Formula (1), repeating units of Formula (8):

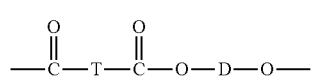
(8)

wherein D is a divalent group derived from a dihydroxy compound, and may be, for example, a $C_{2-10}$ alkyl group, a $C_{6-20}$ cycloalkyl group, a $C_{6-20}$ aromatic group, or a polyoxyalkylene group in which the alkylene groups contain 2 to about 6 carbon atoms, specifically 2, 3, or 4 carbon atoms; and T is a divalent group derived from a dicarboxylic acid, and may be, for example, a $C_{2-10}$ alkyl group, a $C_{6-20}$ cycloalkyl group, a $C_{6-20}$ substituted aryl group, or a $C_{6-20}$ aromatic group.

In one embodiment, D is a $C_{2-30}$ alkyl group having a straight chain, branched chain, or cyclic (including polycyclic) structure. In another embodiment, D is derived from an aromatic dihydroxy compound of Formula (4) above. In another embodiment, D is derived from an aromatic dihydroxy compound of Formula (7) above.

Examples of aromatic dicarboxylic acids that may be used to prepare the polyester units include isophthalic or terephthalic acid, 1,2-di(p-carboxyphenyl)ethane, 4,4'-dicarboxydiphenyl ether, 4,4'-bisbenzoic acid, and combinations comprising at least one of the foregoing acids. Acids containing fused rings can also be present, such as in 1,4-, 1,5-, or 2,6-naphthalenedicarboxylic acids. Specific dicarboxylic acids are terephthalic acid, isophthalic acid, naphthalene dicarboxylic acid, cyclohexane dicarboxylic acid, or combinations thereof. A specific dicarboxylic acid comprises a combination of isophthalic acid and terephthalic acid wherein the weight ratio of isophthalic acid to terephthalic acid is about 91:9 to about 2:98. In another specific embodiment, D is a $C_{2-6}$ alkyl group and T is p-phenylene, m-phenylene, naphthalene, a divalent cycloaliphatic group, or a combination thereof. This class of polyester includes the poly(alkylene terephthalates).

The molar ratio of ester units to carbonate units in the copolymers may vary broadly, for example 1:99 to 99:1, specifically 10:90 to 90:10, more specifically 25:75 to 75:25, depending on the desired properties of the final composition.

In a specific embodiment, the polyester unit of a polyester-polycarbonate may be derived from the reaction of a combination of isophthalic and terephthalic diacids (or derivatives thereof) with resorcinol. In another specific embodiment, the polyester unit of a polyester-polycarbonate is derived from the reaction of a combination of isophthalic acid and terephthalic acid with bisphenol-A. In a specific embodiment, the polycarbonate units are derived from bisphenol-A. In another specific embodiment, the polycarbonate units are derived from resorcinol and bisphenol-A in a molar ratio of resorcinol carbonate units to bisphenol-A carbonate units of 1:99 to 99:1.

Suitable polycarbonate blocks for the block copolymer can be manufactured by processes such as interfacial polymerization. Although the reaction conditions for interfacial polymerization may vary, an exemplary process generally involves dissolving or dispersing a dihydric phenol reactant in aqueous caustic soda or potash, adding the resulting mixture to a suitable water-immiscible solvent medium, and contacting the reactants with a carbonate precursor in the presence of a suitable catalyst such as triethylamine or a phase transfer catalyst, under controlled pH conditions, e.g., about 8 to about 10. The most commonly used water immiscible solvents include methylene chloride, 1,2-dichloroethane, chlorobenzene, toluene, and the like.

Suitable carbonate precursors include, for example, a carbonyl halide such as carbonyl bromide or carbonyl chloride, or a haloformate such as a bishaloformates of a dihydric phenol (e.g., the bischloroformates of bisphenol A, hydroquinone, or the like) or a glycol (e.g., the bishaloformate of ethylene glycol, neopentyl glycol, polyethylene glycol, or the like). Combinations comprising at least one of the foregoing types of carbonate precursors may also be used. In an exemplary embodiment, an interfacial polymerization reaction to form carbonate linkages uses phosgene as a carbonate precursor, and is referred to as a phosgenation reaction.

Among the phase transfer catalysts that may be used are catalysts of the Formula $(R^3)_4Q^+X$, wherein each $R^3$ is the same or different, and is a $C_{1-10}$ alkyl group; Q is a nitrogen or phosphorus atom; and X is a halogen atom or a $C_{1-8}$ alkoxy group or $C_{6-18}$ aryloxy group. Suitable phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br⁻, a $C_{1-8}$ alkoxy group or a $C_{6-18}$ aryloxy group. An effective amount of a phase transfer catalyst may be about 0.1 to about 10 wt % based on the weight of bisphenol in the phosgenation mixture. In another embodiment an effective amount of phase transfer catalyst may be about 0.5 to about 2 wt % based on the weight of bisphenol in the phosgenation mixture.

All types of polycarbonate end groups are contemplated as being useful in the polycarbonate block, provided that such end groups do not significantly adversely affect desired properties of the compositions.

Branched polycarbonate blocks may be prepared by adding a branching agent during polymerization. These branching agents include polyfunctional organic compounds containing at least three functional groups selected from hydroxyl, carboxyl, carboxylic anhydride, haloformyl, and mixtures of the foregoing functional groups. Specific examples include trimellitic acid, trimellitic anhydride, trimellitic trichloride, tris-p-hydroxy phenyl ethane, isatin-bisphenol, tris-phenol TC (1,3,5-tris((p-hydroxyphenyl)isopropyl)benzene), tris-phenol PA (4(4(1,1-bis(p-hydroxyphenyl)-ethyl)alpha, alpha-dimethyl benzyl) phenol), 4-chloroformyl phthalic anhydride, trimesic acid, and benzophenone tetracarboxylic acid. The branching agents may be added at a level of about 0.05 to about 2.0 wt %. Mixtures comprising linear polycarbonate blocks and branched polycarbonate blocks may be used.

A chain stopper (also referred to as a capping agent) may be included during polymerization. The chain-stopper limits molecular weight growth rate, and so controls molecular weight in the polycarbonate blocks. Exemplary chain-stoppers include certain mono-phenolic compounds, mono-carboxylic acid chlorides, and/or mono-chloroformates. Suitable mono-phenolic chain stoppers are exemplified by monocyclic phenols such as phenol and $C_1$-$C_{22}$ alkyl-substituted phenols such as p-cumyl-phenol, resorcinol monobenzoate, and p- and tertiary-butyl phenol; and monoethers of diphenols, such as p-methoxyphenol. Alkyl-substituted phenols with branched chain alkyl substituents having 8 to 9 carbon atom may be specifically mentioned. Certain mono-phenolic UV absorbers may also be used as a capping agent, for example 4-substituted-2-hydroxybenzophenones and their derivatives, aryl salicylates, monoesters of diphenols such as resorcinol monobenzoate, 2-(2-hydroxyaryl)-benzotriazoles and their derivatives, 2-(2-hydroxyaryl)-1,3,5-triazines and their derivatives, and the like.

Mono-carboxylic acid chlorides may also be used as chain stoppers. These include monocyclic, mono-carboxylic acid chlorides such as benzoyl chloride, $C_1$-$C_{22}$ alkyl-substituted benzoyl chloride, toluoyl chloride, halogen-substituted benzoyl chloride, bromobenzoyl chloride, cinnamoyl chloride, and combinations thereof; polycyclic, mono-carboxylic acid chlorides such as trimellitic anhydride chloride, and naphthoyl chloride; and combinations of monocyclic and polycyclic mono-carboxylic acid chlorides. Chlorides of aliphatic monocarboxylic acids with less than or equal to about 22 carbon atoms are suitable. Functionalized chlorides of aliphatic monocarboxylic acids, such as acryloyl chloride and methacryoyl chloride, are also suitable. Also suitable are mono-chloroformates including monocyclic, mono-chloroformates, such as phenyl chloroformate, alkyl-substituted phenyl chloroformate, p-cumyl phenyl chloroformate, toluene chloroformate, and combinations thereof.

The polyester-polycarbonates may also be prepared by interfacial polymerization. Rather than utilizing the dicarboxylic acid per se, it is possible, and sometimes even preferred, to employ the reactive derivatives of the acid, such as the corresponding acid halides, in particular the acid dichlorides and the acid dibromides. Thus, for example instead of using isophthalic acid, terephthalic acid, or a combination comprising at least one of the foregoing, it is possible to employ isophthaloyl dichloride, terephthaloyl dichloride, and a combination comprising at least one of the foregoing.

The polyesters may be obtained by interfacial polymerization or melt-process condensation as described above, by solution phase condensation, or by transesterification polymerization wherein, for example, a dialkyl ester such as dimethyl terephthalate may be transesterified with ethylene glycol using acid catalysis, to generate poly(ethylene terephthalate). It is possible to use a branched polyester in which a branching ageit, for example, a glycol having three or more hydroxyl groups or a trifunctional or multifunctional carboxylic acid has been incorporated. Furthermore, it is sometime desirable to have various concentrations of acid and hydroxyl end groups on the polyester, depending on the ultimate end use of the composition.

Useful polyesters may include aromatic polyesters, poly (alkylene esters) including poly(alkylene arylates), and poly (cycloalkylene diesters). Aromatic polyesters may have a polyester structure according to Formula (8), wherein D and T are each aromatic groups as described hereinabove. In an embodiment, useful aromatic polyesters may include, for example, poly(isophthalate-terephthalate-resorcinol) esters, poly(isophthalate-terephthalate-bisphenol-A) esters, poly [(isophthalate-terephthalate-resorcinol)ester-co-(isophthalate-terephthalate-bisphenol-A)]ester, or a combination comprising at least one of these. Also contemplated are aromatic polyesters with a minor amount, e.g., about 0.5 to about 10 wt %, based on the total weight of the polyester, of units derived from an aliphatic diacid and/or an aliphatic polyol to make copolyesters. Poly(alkylene arylates) may have a polyester structure according to Formula (8), wherein T comprises groups derived from aromatic dicarboxylates, cycloaliphatic dicarboxylic acids, or derivatives thereof. Examples of specifically useful T groups include 1,2-, 1,3-, and 1,4-phenylene; 1,4- and 1,5-naphthylenes; cis- or trans-1,4-cyclohexylene; and the like. Specifically, where T is 1,4-phenylene, the poly(alkylene arylate) is a poly(alkylene terephthalate). In addition, for poly(alkylene arylate), specifically useful alkylene groups D include, for example, ethylene, 1,4-butylene, and bis-(alkylene-disubstituted cyclohexane) including cis- and/or trans-1,4-(cyclohexylene) dimethylene. Examples of poly(alkylene terephthalates) include poly(ethylene terephthalate) (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). A specifically suitable poly(cycloalkylene diester) is poly(cyclohexanedimethylene terephthalate) (PCT). Combinations comprising at least one of the foregoing polyesters may also be used.

Copolymers comprising alkylene terephthalate repeating ester units with other suitable ester groups may also be useful. Specifically useful ester units may include different alkylene terephthalate units, which can be present in the polymer chain as individual units, or as blocks of poly(alkylene terephthalates). Specifically suitable examples of such copolymers include poly(cyclohexanedimethylene terephthalate)-co-poly(ethylene terephthalate), abbreviated as PETG where the polymer comprises greater than or equal to 50 mol % of poly(ethylene terephthalate), and abbreviated as PCTG where the polymer comprises greater than 50 mol % of poly(1,4-cyclohexanedimethylene terephthalate).

Suitable poly(cycloalkylene diester)s may also include poly(alkylene cyclohexanedicarboxylate)s. Of these, a specific example is poly(1,4-cyclohexanedimethanol-1,4-cyclohexanedicarboxylate) (PCCD), having recurring units of Formula (9):

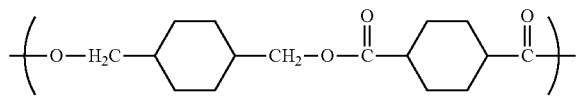
(9)

which is Formula (8) where D is a 1,4-cyclohexanedimethylene group derived from 1,4-cyclohexanedimethanol, and T is a cyclohexane ring derived from cyclohexanedicarboxylate or a chemical equivalent thereof, and may comprise the cis-isomer, the trans-isomer, or a combination comprising at least one of the foregoing isomers.

The amount of polycarbonate and polyester employed is dependent upon attaining the desired optical and structural properties of the article. The polycarbonate and polyester may be used in a weight ratio of 1:99 to 99:1, specifically 10:90 to 90:10, and more specifically 30:70 to 70:30, depending on the function and properties desired.

The polycarbonate blocks of the silicone polycarbonate block copolymer are constructed as described above, i.e. from the polymerization of a dihydroxy aromatic compound with a carbonate precursor. In particular embodiments, the polycarbonate blocks can be made from bisphenols of Formula (4) containing from 6 to 36 carbon atoms. When polyester units of Formula (8) are present, the polyester unit can be formed from an aryl or alkyl dicarboxylic acid having from 6 to 50 carbon atoms. The dicarboxylic acid can also be in a derivative form, such as a salt or acid halide thereof. The polycarbonate blocks generally have a glass transition temperature of 70° C. or greater.

In embodiments, each polycarbonate block is formed from a repeating unit having the structure of Formula (I):

Formula (I)

wherein $A^1$ and $A^2$ are independently a monocyclic divalent aryl group, and Y is a bridging group having one or two atoms that separate $A^1$ from $A^2$. This is the same definition as applied in Formula (3). The phrase "having one or two atoms that separate $A^1$ from $A^2$" means that Y provides only one or two atoms between $A^1$ and $A^2$, and does not mean that Y has only one or two atoms. In specific embodiments, Y is a saturated hydrocarbon group.

In specific embodiments, each repeating unit is derived from the reaction of bisphenol-A with phosgene, as illustrated below in Formula (II):

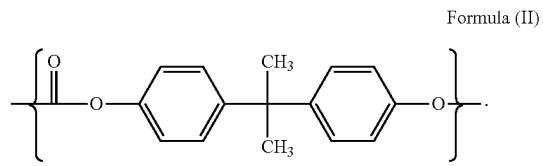
Formula (II)

It should be noted that each polycarbonate block may contain one or more such repeating units. In embodiments, a polycarbonate block may have from 10 to 45 repeating units of Formula (I) or (II).

The silicone blocks comprise diorganosiloxane units of Formula (10):

(10)

wherein each R is, independently, a $C_{1-13}$ monovalent organic group; and E has an average value of 5 to 50. For example, R may be a $C_1$-$C_{13}$ alkyl group, $C_2$-$C_{13}$ alkenyl group, $C_2$-$C_{13}$ alkenyloxy group, $C_3$-$C_6$ cycloalkyl group, $C_3$-$C_6$ cycloalkoxy group, $C_6$-$C_{14}$ aryl group, $C_6$-$C_{10}$ aryloxy group, $C_7$-$C_{13}$ aralkyl group, $C_7$-$C_{13}$ aralkoxy group, $C_7$-$C_{13}$ alkylaryl group, or $C_7$-$C_{13}$ alkylaryloxy group. Combinations comprising at least one of the foregoing R groups may be used in different silicone blocks in the same copolymer. Those of ordinary skill in the art will understand that the value of E is the average value of diorganosiloxane units in a mixture of silicone blocks. The notation "Dn" will be used herein to refer to the average number of diorganosiloxane units; for example, D45 means that the silicone blocks have an average value for E of 45.

In one embodiment, the polydiorganosiloxane blocks are provided by repeating structural units of Formula (11):

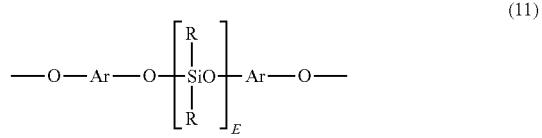
(11)

wherein E is as defined above; each R may be the same or different, and is as defined above; and Ar may be the same or different, and is a substituted or unsubstituted $C_6$-$C_{30}$ arylene group, wherein the bonds are directly connected to an aromatic moiety. Suitable Ar groups in Formula (11) may be derived from a $C_6$-$C_{30}$ dihydroxyarylene compound, for example a dihydroxyarylene compound of Formula (3), (4), or (7) above. Combinations comprising at least one of the foregoing dihydroxyarylene compounds may also be used. Specific examples of suitable dihydroxyarylene compounds are 1,1-bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2-bis(4-hydroxyphenyl)octane, 1,1-bis(4-hydroxyphenyl)propane, 1,1-bis(4-hydroxyphenyl)n-butane, 2,2-bis(4-hydroxy-1-methylphenyl)propane, 1,1-bis(4-hydroxyphenyl)cyclohexane, bis(4-hydroxyphenyl sulfide), and 1,1-bis(4-hydroxy-t-butylphenyl)propane.

Combinations comprising at least one of the foregoing dihydroxy compounds may also be used.

Such units may also be derived from the corresponding dihydroxy compound, a difunctional phenolic terminated siloxane, of Formula (12):

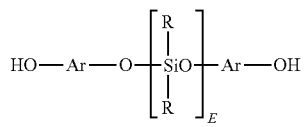

wherein Ar and E are as described above. Compounds of Formula (12) may be obtained by the reaction of a dihydroxyarylene compound, for example, with an alpha, omega-bisacetoxypolydiorganosiloxane under phase transfer conditions, or with alpha, omega dichloro polydiorganosiloxanes under anhydrous conditions.

In another embodiment, polydiorganosiloxane blocks comprise units of Formula (13):

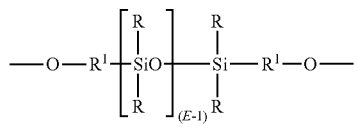

wherein R and E are as described above, and each occurrence of $R^1$ is independently a divalent $C_7$-$C_{30}$ aliphatic or aromatic group or combination thereof, and wherein the polymerized polysiloxane unit is the reaction residue of its corresponding dihydroxy compound. In a specific embodiment, the polydiorganosiloxane blocks are provided by repeating structural units of Formula (14):

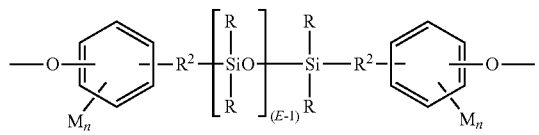

wherein R and E are as defined above. Each $R^2$ in Formula (14) is independently a divalent $C_2$-$C_8$ aliphatic or aromatic group or combination thereof. Each M in Formula (14) may be the same or different, and may be a halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_6$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy, wherein each n is independently 0, 1, 2, 3, or 4.

In one embodiment, M is bromo or chloro, an alkyl group such as methyl, ethyl, or propyl, an alkoxy group such as methoxy, ethoxy, or propoxy, or an aryl group such as phenyl, chlorophenyl, or tolyl; $R^2$ is a dimethylene, trimethylene or tetramethylene group; and R is a $C_{1-8}$ alkyl, haloalkyl such as trifluoropropyl, cyanoalkyl, or aryl such as phenyl, chlorophenyl or tolyl. In another embodiment, R is methyl, or a combination of methyl and trifluoropropyl, or a combination of methyl and phenyl. In still another embodiment, M is methoxy, n is one, $R^2$ is a divalent $C_1$-$C_3$ aliphatic group, and R is methyl.

Units of Formula (14) may be derived from the corresponding dihydroxy polydiorganosiloxane (15):

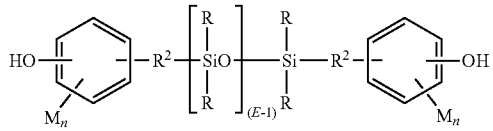

wherein R, E, M, $R^2$, and n are as described above. This compound of Formula (15) can also be described as a polysiloxane endcapped at each end by a phenol, or as a difunctional phenolic terminated polysiloxane. Such dihydroxy polysiloxanes can be made by effecting a platinum-catalyzed addition between an aliphatically unsaturated monohydric phenol and a siloxane hydride of Formula (16):

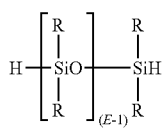

wherein R and E are as previously defined. Suitable aliphatically unsaturated monohydric phenols included, for example, eugenol (4-allyl-2-methoxyphenol), 4-allylphenol, 2-alkylphenol, 4-allyl-2-methylphenol, 4-allyl-2-phenylphenol, 4-allyl-2-bromophenol, 4-allyl-2-t-butoxyphenol, 4-phenyl-2-phenylphenol, 2-methyl-4-propylphenol, 2-allyl-4,6-dimethylphenol, 2-allyl-4-bromo-6-methylphenol, 2-allyl-6-methoxy-4-methylphenol, vinyl phenol, and 2-allyl-4,6-dimethylphenol. Combinations comprising at least one of the foregoing may also be used.

The silicone blocks of the silicone polycarbonate block copolymer generally have a glass transition temperature from minus 130° C. to minus 50° C.

Desirably, each silicone block has the structure of Formula (III):

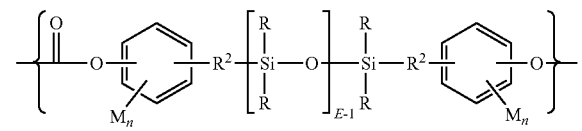

Formula (III)

wherein E is from 5 to 50; each R is independently a $C_{1-13}$ monovalent organic group; each $R^2$ is independently a divalent $C_{2-8}$ aliphatic or aromatic group or combination thereof; each M is independently halogen, cyano, nitro, $C_1$-$C_8$ alkylthio, $C_1$-$C_8$ alkyl, $C_1$-$C_8$ alkoxy, $C_2$-$C_8$ alkenyl, $C_2$-$C_8$ alkenyloxy group, $C_3$-$C_8$ cycloalkyl, $C_3$-$C_8$ cycloalkoxy, $C_6$-$C_{10}$ aryl, $C_8$-$C_{10}$ aryloxy, $C_7$-$C_{12}$ aralkyl, $C_7$-$C_{12}$ aralkoxy, $C_7$-$C_{12}$ alkylaryl, or $C_7$-$C_{12}$ alkylaryloxy; and each n is independently 0, 1, 2, 3, or 4. This is the same definition as applied in Formulas (14) and (15). Put another way, unlike the polycarbonate blocks which can contain multiple repeating units, each silicone block should be formed from only one monomer of Formula (15). This aspect is discussed further herein.

In particular embodiments, $R_2$ is $C_{2-8}$ alkylene; R is $C_{1-8}$ alkyl or haloalkyl, or is aryl; M is $C_{1-8}$ alkyl or $C_{1-8}$ alkoxy; n is 0, 1, or 2; and E is from 5 to 50. In more specific embodiments, E is from about 10 to 45, or is from 20 to 40, or is from 30 to 50.

In specific embodiments, the silicone blocks are endcapped with eugenol, and the diorganosiloxane units are dimethylsiloxane units, as illustrated below in Formula (IV):

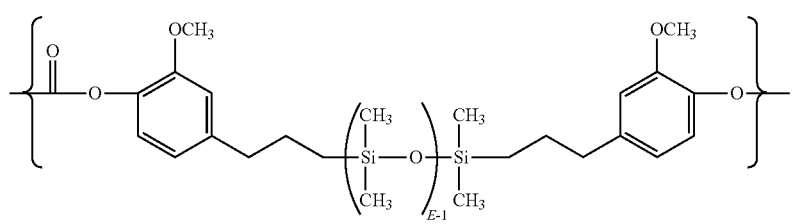

Formula (IV)

wherein E is from 5 to 50.

In another embodiment, the silicone blocks are endcapped with allyl phenol, and the diorganosiloxane units are dimethylsiloxane units, as illustrated below in Formula (V):

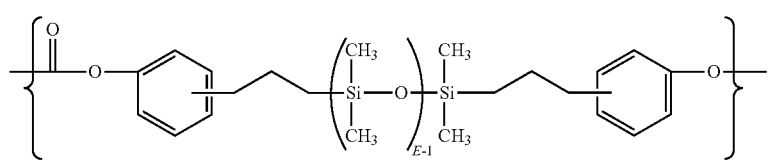

Formula (V)

wherein E is from 5 to 50.

The silicone blocks make up from 50 wt % to 90 wt % of the block copolymer. The polycarbonate blocks make up from 10 wt % to 50 wt % of the block copolymer. In more specific embodiments, the silicone blocks make up from 55 wt % to 80 wt % of the block copolymer and the polycarbonate blocks make up from 20 wt % to 45 wt % of the block copolymer. In other specific embodiments, the silicone blocks make up from 50 wt % to 70 wt % of the block copolymer and the polycarbonate blocks make up from 30 wt % to 50 wt % of the block copolymer. It is specifically contemplated that the block copolymers are diblock copolymers. The block copolymers generally have a weight average molecular weight (Mw) of from 10,000 to 100,000.

The silicone polycarbonate block copolymers of the present disclosure are clear (meet a specific % T requirement), elastomeric, and have a combination of good mechanical properties. In particular, the silicone polycarbonate block copolymers have at least 30% elongation before yield, as measured by ASTM D638. This value is typically measured at 25° C. In some cases the silicone polycarbonate copolymers are snappy elastomers with an elastic recovery of over 30%. In other instances they can be stretched to 50% of their initial length and recover quickly with no permanent deformation. In yet other instances the copolymers can be deformed to 100% of their original length without breakage or permanent deformation. In embodiments, the silicone polycarbonate block copolymers may also have a % T of 60% or greater and a haze level of 20% or less when measured at 1.0 millimeter thickness according to ASTM D1003; a yellowness index (YI) of 10 or less when measured according to ASTM D6290; or a Shore D hardness of from 5 to 30 as measured by ASTM D2240. The silicone polycarbonate block copolymers may have any combination of these properties. It should be noted that some of the properties are measured using articles made from the block copolymers; however, such properties are described as belonging to the block copolymers for ease of reference.

In some specific embodiments, the block copolymers have at least 30% elongation before yield, as measured by ASTM D638; a % T of 70% or greater and a haze level of 10% or less when measured at 1.0 millimeter thickness according to ASTM D1003; a yellowness index (YI) of 10 or less when measured according to ASTM D6290; and a Shore D hardness of from 5 to 20 as measured by ASTM D2240.

In other specific embodiments, the block copolymers have at least 30% elongation before yield, as measured by ASTM D638; a % T of 85% or greater and a haze level of 15% or less when measured at 1.0 millimeter thickness according to ASTM D1003; a yellowness index (YI) of 6 or less when measured according to ASTM D6290; and a weight average molecular weight of from 30,000 to 50,000.

The silicone polycarbonate block copolymers will, in embodiments, have a residual chloride content of less than 10 ppm, a free bisphenol content below 200 ppm, a residual iron content below 5 ppm, or less than 300 ppm of residual organic solvent from the group consisting of methylene chloride, chloroform, chlorobenzene, dichlorobenzene, toluene, xylene, and mixtures thereof. In other instances, the silicone polycarbonate block copolymers will have uncapped phenolic (—OH) endgroups of less than 100 ppm.

The present disclosure relates to the discovery that in order to obtain an elastomer with high clarity and low haze, the type of linkages made between the repeating units should be controlled. Generally, the block copolymer can be considered as being formed from a bisphenol of Formula (3) and an endcapped silicone of Formula (15), with carbonate linkages between these monomers. There are then three types of carbonate linkages present in the block copolymer: bisphenol-bisphenol (B-B), endcapped silicone-endcapped silicone (E-E), and endcapped silicone-bisphenol (E-B). The combination of elastomeric properties and high transparency is achieved when the number of E-E linkages is minimized. E-E linkages are undesired because this type of linkage effectively extends the length of the silicone block, which causes phase separation in the resulting block copolymer and consequent haze or opacity. Generally, the number of E-E linkages should be below about 20 mole %, based on the number of carbonate linkages in the block copolymer. When the silicone block length is shorter, for example when E is 5 to 20 in Formula (15), more E-E linkages can be formed in the block copolymer without sacrificing transparency. However, when the silicone block length is greater, the block copolymer can only tolerate fewer E-E linkages before turning hazy. In some embodiments, the number of E-E linkages is 10 mole % or less.

The three types of linkages are generally illustrated below, with reference to Formulas (3) and (15):

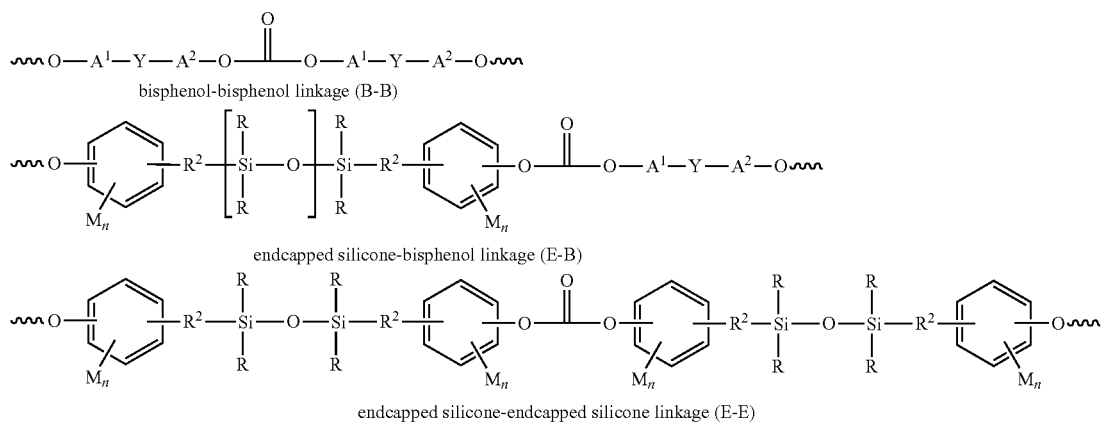

The clear silicone polycarbonate elastomeric block copolymers of the present disclosure are synthesized to ensure low levels of silicone chain extension, i.e. low numbers of E-E linkages. Generally, siloxane bischloroformates are prepared and added to a reaction mixture in which has been reacted a bisphenol and a carbonate precursor. The bisphenol and carbonate precursor initially form the polycarbonate blocks, and the siloxane bischloroformates are subsequently added at a very low rate with a high ratio of additional carbonate precursor to enhance the reaction of the siloxane bischloroformate with the polycarbonate blocks. As the length of the silicone block increases up to about 50 siloxane units it becomes even more critical to ensure that there is a low level of silicone to silicone block chain extension as the coupled or extended silicone block length can effectively be about 100, resulting in haze, phase separation, and in some instances delamination.

In some specific embodiments, the copolymer contains 10 mole % or less of E-E linkages, 50 to 70 wt % of silicone blocks, and 30 to 50 wt % of polycarbonate blocks; and the value of E (i.e. number of siloxane units) is from 30 to 50.

The siloxane bischloroformate is prepared from a siloxane bisphenol. A siloxane bisphenol is a dihydroxy aromatic compound incorporating one or more siloxane repeat units. Typically, the siloxane bisphenols used to prepare the siloxane bischloroformates are isomeric mixtures that may comprise a single major isomer. The structures shown in this disclosure are idealized, and encompass both a single isomer as well as isomeric mixtures. The compound of Formula (15) is a siloxane bisphenol, and is reproduced here for easy reference:

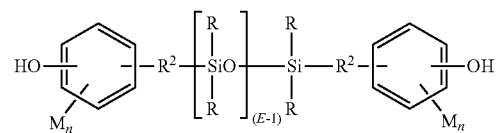

wherein R, E, M, R², and n are as described above.

Methods for producing siloxane bischloroformates are disclosed in U.S. Pat. Nos. 6,723,864 and 6,930,194, the disclosures of which are hereby fully incorporated by reference herein.

The resulting siloxane bischloroformate is illustrated in Structure (17):

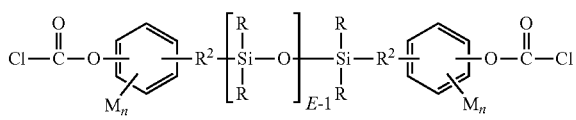

As described above, the polycarbonate blocks are produced by the reaction of a bisphenol with a carbonate precursor in water and a water-immiscible solvent in the presence of a catalyst and optionally a chain stopper. In embodiments, the molar ratio of bisphenol to carbonate precursor is in the range of from about 1:1 to about 10:1. The pH of the aqueous phase is maintained in the range of about 9 to about 11.

The siloxane bischloroformate is subsequently added to the reaction mixture containing the polycarbonate blocks, along with a large excess of the carbonate precursor. During the reaction of the siloxane bischloroformate with the polycarbonate blocks, the pH is maintained in the range of about 9 to about 11. The overall reaction occurs over a total period of from 30 minutes to about 60 minutes. Additional information can be found in U.S. Pat. Nos. 6,833,422; 6,870,013; 7,232,865; and 7,888,447, the disclosures of which are hereby fully incorporated by reference herein.

The resulting silicone polycarbonate elastomeric block copolymer is then isolated and purified by conventional means, for example by centrifuging, washing, and drying.

The silicone polycarbonate elastomeric block copolymers of the present disclosure may be used in thermoplastic compositions comprising the block copolymer and other polymers. The compositions may also include various additives such as antioxidants, stabilizers, colorants, and the like, with the proviso that the additives do not adversely affect the desired properties of the polymeric compositions.

The block copolymers and compositions comprising the block copolymers may be shaped, formed, or molded into articles having high transparency, elastomeric properties, and other excellent mechanical properties. They can be molded into useful shaped articles by a variety of means such as injection molding, extrusion, rotational molding, blow molding and thermoforming to form various molded articles. Such articles may include flexible tubing, gaskets, grips, handles, push buttons, belts, connectors, wire coatings, insulators, sheets, tires, bladders, balls, exercise devices, athletic foot wear, mats, flooring, cushions, wheels, washers, grommets, membranes, mallets, tool handles, medical devices, catheters, aspirators, conduits, face masks, protective devices, eyewear, lenses, cookware, housings for various electronic devices; components of lighting fixtures; ornaments; roofs; greenhouses; sun rooms; swimming pool enclosures; lamp housings; glazing; roofs; windows; treated covers for pictures; paintings; posters; and like display items; optical lenses; ophthalmic lenses; corrective ophthalmic lenses; implantable ophthalmic lenses; and similar applications. Articles may comprise various layers or overmolding using the silicone polycarbonate elastomer and other resins.

The following examples are provided to illustrate the block copolymers, compositions, articles, and methods of the present disclosure. The examples are merely illustrative and are not intended to limit the disclosure to the materials, conditions, or process parameters set forth therein.

EXAMPLES

Polymerization Reaction

Polymerization reactions were performed using a batch reactor system with a tubular reactor for the preparation and introduction of the bis-chloroformate of D45 eugenol-capped siloxane. The following reaction description is given for an optimized 60% D45 siloxane copolycarbonate batch, and is only representative.

To the formulation tank was added dichloromethane (8 L), DI water (7 L), bisphenol-A (1200 grams, 5.3 moles), p-cumylphenol (59 grams, 0.28 moles), triethylamine (30 grams, 0.30 moles) and sodium gluconate (10 grams). The mixture was transferred to the batch reactor. The reactor agitator was started and circulation flow was set at 80 L/min. Phosgene flow to the batch reactor was initiated (segment 1: 10 grams, 15 grams/min rate). A pH target of 9.5 was maintained throughout the reaction by the computer-controlled addition of 33% aqueous sodium hydroxide.

After 10 grams of phosgene had been added to the batch reactor, the tubular reactor was initiated to add D45 siloxane to the batch reactor (3300 grams, 0.85 moles, 20 wt % solution in dichloromethane chilled to 50° F.). The D45 flow rate through the tubular reactor was 1000 grams/minute, with a 16 minute addition cycle. Phosgene was added to the tubular reactor at a rate of 36 grams/min (6.8 moles phosgene per mole D45) and 18% aqueous sodium hydroxide flowed to the tubular reactor at 403 grams/min (5 moles NaOH per mole phosgene, chilled to 40° F.). After the D45 siloxane was completely added to the batch reactor, the tubular reactor was flushed with dichloromethane (2 L) and deionized water (2 L).

Phosgene flow continued to the batch reactor during the tubular reactor cycle (segment 2: 420 grams, 15 grams/min rate). Phosgene flow to the batch reactor was increased after the contents of the tubular reactor were completely emptied into the batch reactor (segment 3: 570 grams, 50 grams/min rate). The total phosgene addition time for all three segments was 40 minutes. After this addition time, the reaction was complete and the silicone polycarbonate block copolymer was formed.

A sample of the batch reactor was obtained and verified to be free of unreacted bisphenol-A and free of chloroformate. The weight average molecular weight (Mw) of the reaction sample was determined by GPC (Mw=42593, PDI=2.3). The batch reactor was purged with nitrogen, then the batch was transferred to the feed tank of a centrifuge for purification.

Dichloromethane (8 L) was added to the batch in the feed tank. The mixture was then purified using a train of liquid-liquid centrifuges. Centrifuge one removed the brine phase. Centrifuge two removed the catalyst by extracting the resin solution with aqueous hydrochloric acid (pH 1). Centrifuges three through eight removed residual ions by extracting the resin solution with deionized water. A sample of the resin solution was tested and verified to contain less than 5 ppm each of ionic chloride and residual triethylamine.

The resin solution was transferred to the precipitation feed tank. The resin was isolated as a white powder by steam precipitation followed by drying in a cone shaped dryer using heated nitrogen (180° F.). The powder yield was 3130 grams. The Mw was 38177.

Test Batches

Twelve test batches were formulated as described below in Table 1. They varied in the ratio of bisphenol-A (BPA) to D45 siloxane, and in the amount of p-cumylphenol (PCP) added as endcapping agent.

TABLE 1

| Batch Number | Formulation | BPA (g) | BPA (moles) | D45 (g) | D45 (moles) | PCP (moles) | Polymer Mw |
|---|---|---|---|---|---|---|---|
| 280 | 40% D45 | 2250 | 9.86 | 2250 | 0.58 | 0.33 | 33820 |
| 281 | 40% D45 | 2250 | 9.86 | 2250 | 0.58 | 0.32 | 37316 |
| 282 | 40% D45 | 2250 | 9.86 | 2250 | 0.58 | 0.33 | 38267 |
| 283 | 40% D45 | 2250 | 9.86 | 2250 | 0.58 | 0.34 | 38479 |
| 285 | 50% D45 | 1700 | 7.45 | 2800 | 0.73 | 0.25 | 38951 |
| 286 | 50% D45 | 1700 | 7.45 | 2800 | 0.73 | 0.24 | 44737 |
| 288 | 50% D45 | 1700 | 7.45 | 2800 | 0.73 | 0.28 | 36234 |
| 289 | 50% D45 | 1700 | 7.45 | 2800 | 0.73 | 0.27 | 37477 |
| 290 | 60% D45 | 1200 | 5.26 | 3300 | 0.85 | 0.28 | 32197 |
| 291 | 60% D45 | 1200 | 5.26 | 3300 | 0.85 | 0.27 | 32847 |
| 292 | 60% D45 | 1200 | 5.26 | 3300 | 0.85 | 0.26 | 47922 |
| 293 | 60% D45 | 1200 | 5.26 | 3300 | 0.85 | 0.27 | 34184 |

The block copolymers of the twelve batches were used to make molded samples for testing.

Extrusion: All ingredients were dry blended for about 4 minutes using a paint shaker. Formulations were compounded on a vacuum vented 30 mm twin screw extruder at about 285-300° C. barrel set temperature at about 250-400 rpm. Samples were not dried prior to extrusion. The torque was low (about 30-40%). The samples were run with no vacuum. A 15-foot long water bath was used to maximize strand cooling.

Molding: Samples were dried in a dehumidifying dryer for 3-4 hours at 85-100° C. and molded at 440-460° F., 0.3 to 0.8 inches/sec. fill, 900 psi pressure and an 80° F. mold. No evolution of gas or volatile species was seen. Molded parts could be easily reground at room temperature.

Testing: Standard ASTM testing was done at 50% relative humidity. The melt volume rate (MVR) was run at 300° C./1.2 Kg load at 360 second dwell according to ASTM D1238.

DMA (dynamic mechanical analysis) was run on pressed films at 3° C./min at 1 Hertz in flex using both single and double cantilever mode as per ASTM D4065. A polycarbonate block Tg was determined using a single cantilever set up.

The Shore A and Shore D hardnesses were measured on a Zwick machine on injection molded parts. The ASTM 02240 method was used.

Tensile tests were run on 7×⅛ inch injection molded dumbbell shaped bars using a low modulus tensile test based on ASTM D638. The crosshead speed was 5 mm/min, modulus/stress was measured at 5, 10 and 50% strain. Stress at break, elongation at break, and strain at break are reported.

Recoverable elongation/elasticity was measured by holding a 6 inch extruded strand of ~⅛ inch diameter by a yardstick and pulling it to at least 30% of its original length (9 inches). In other instances the strand was pulled to twice (100%) its original length (12 inches). Polycarbonate-siloxane copolymers with at least 50% silicone content stretched with no breakage and when released quickly snapped back to their original length, like a rubber band. The same strand could be repeatedly (at least 5 times) put through this elongation with no permanent deformation.

Molecular weights were measured using GPC as per ASTM D5296 and calibrated to polycarbonate standards.

The static contact angle was measured at room temperature using deionized water on a clear pressed film ~1 mm thick.

Table 2 shows some measured properties of the copolymers of Batches 290 and 291.

TABLE 2

| Batch Numbers | 290-291 |
|---|---|
| wt % E-E linkages (avg via CNMR) | 4 |
| Molded Part Mw | 30588 |
| Molded Part Mn | 7840 |
| MVR (300 C. 6 min 1.2 Kg), cc/10 min | 9.9 |
| Tg DMA Single Cantilever (° C.) (polycarbonate phase) | 75.5 |
| Modulus 41C DMA Single Cantilever (MPa) | 16 |
| Modulus 41C DMA Double Cantilever (MPa) | 6 |
| CTE Flow (ppm/° C.) | 104 |
| CTE x-Flow (ppm/° C.) | 206 |
| Shore D Hardness | 12 |
| Shore A Hardness | 67 |
| Density (g/cm$^3$) | 1.0563 |
| Static Contact Angle (pressed film) | 101 |
| Tensile 03 | 5 mm/min. |
| Modulus Elasticity (MPa) | 8 |
| Stress 5% strain (MPa) | 0.1 |
| Stress 10% strain (MPa) | 0.6 |
| Stress 50% strain (MPa) | 0.7 |
| Stress @ break (MPa) | 2.5 |
| % Elongation no yield | 45 |
| % Strain at Break | 197 |

One of the key elements of the block copolymer synthesis was to ensure low levels of silicone chain extension. A $^{13}C$ NMR method was developed to distinguish between the three carbonate linkages (B-B bisphenol-A to bisphenol-A carbonate linkage), E-B (silicone to bisphenol-A carbonate linkage), and E-E silicone to silicone carbonate linkage). Using this method, a total siloxane linkage weight percentage for the block copolymer was defined as the sum of the weight percentages of the E-B and E-E linkages. Note that this is different from the weight percentage of silicone blocks in the block copolymer. A $1^H$ NMR method was used to determine the weight percentage of siloxane in the copolymers.

Table 3 shows the measured linkages for the batches.

TABLE 3

| Batch Number | Formulation | mole % E-E | mole % E-B | wt % E-E | wt % E-B | siloxane linkage wt % |
|---|---|---|---|---|---|---|
| 281 | 40% D45 | 6.3 | 63.5 | 3.7 | 37.8 | 41.5 |
| 282 | 40% D45 | 7.3 | 63.1 | 4.4 | 37.8 | 42.2 |
| 283 | 40% D45 | 8.0 | 62.6 | 4.8 | 37.7 | 42.5 |
| 285 | 50% D45 | 11.6 | 67.8 | 7.9 | 46.3 | 54.2 |
| 286 | 50% D45 | 8.1 | 71.3 | 5.6 | 48.7 | 54.3 |
| 287 | 50% D45 | 5.2 | 74.3 | 3.5 | 50.8 | 54.3 |
| 288 | 50% D45 | 2.0 | 77.4 | 1.4 | 52.9 | 54.2 |
| 289 | 50% D45 | 2.4 | 77.0 | 1.7 | 52.6 | 54.3 |
| 290 | 60% D45 | 5.5 | 79.8 | 4.2 | 60.0 | 64.2 |
| 291 | 60% D45 | 4.9 | 80.9 | 3.7 | 61.2 | 64.8 |
| 292 | 60% D45 | 6.6 | 79.1 | 5.0 | 59.8 | 64.8 |
| 293 | 60% D45 | 5.4 | 80.4 | 4.1 | 60.9 | 65.0 |

NMR spectra were obtained on a Varian XL-300 NMR spectrometer operating at 75.4 MHz for carbon-13. Samples were dissolved in deutero chloroform and, for quantitative analysis, a small amount of Cr(acac)$_3$ was added to shorten the carbon TIS and eliminate any residual NOE. Spectral parameters included a 20 kHz spectral width, 12 ps pulse width (corresponding to a 450 flip angle), gated decoupling to eliminate any residual NOE in the quantitative spectra, 32 thousand data points and a 5 second pulse delay. Total accumulation times varied from a few hours to overnight runs. The B-B, E-B and E-E signals were assigned by preparation of model compounds. For quantitative analysis of the sequence structure, integration of the carbonate carbon resonances at 151.8 (B-B), 151.5 (E-B) and 151.4 ppm (E-E) provided the most direct method of analysis. The three peaks were baseline resolved.

The 40% and 50% D45 block copolymers did not have high elastic recovery and delaminated on molding. They also showed very high melt fracture on extrusion. In contrast the 60% D45 block copolymers extruded well and molded with no delamination.

Copolymers Using Bromo Bisphenol

The invention was further extended to making high silicone content copolymers with tetra-bromo bisphenol-A (TBrBPA).

Example A

In a fashion similar to the polymerization reaction described above, a mixture of equal weights of BPA and TBrBPA were reacted with phosgene and 60 wt % of a D45 eugenol endcapped dimethylsiloxane in a methylene chloride aqueous/caustic mixture. Molecular weight was controlled by addition of p-cumylphenol. After the phenolic groups on the dimethylsiloxane were converted to their corresponding chloroformates, triethylamine was added to promote polymerization. The polymer was allowed to build molecular weight in the presence of additional phosgene. When the reaction was complete, the methylene chloride solution of copolymer was separated from the brine and washed with hydrochloric acid and water to remove salt and other impurities. The methylene chloride was evaporated by application of steam and the copolymer was isolated as a powder. The powder was dried at 125° C. for several hours and could be pressed into clear films. These copolymers were extruded into strands ~⅛ inch diameter. These strands could be stretched to over twice their length and return to their original length.

Example B

In a further example, 60% D45 eugenol capped dimethyl silicone was reacted with 40 wt % TBrBPA and phosgene to make a clear bromosiloxane polycarbonate copolymer. Molecular weight was controlled by addition of p-cumylphenol. These copolymers were extruded into strands ~⅛ inch diameter which could also be stretched to over twice their length and return to their original length.

Table 4 shows some measurements made on these two copolymers. The percent total volatiles (% TV) was determined by placing a resin sample in a combination infrared-balance at 125° C. for 12 minutes and determining the weight loss. Fe content in ppm was determined in a resin sample by UV-Vis colorimetric method using a Ferrozine derivative. Dried Cl is the chloride content of the resin, in ppm, determined by potentiometric titration after drying. Low volatiles, very iron and low chlorides are all important in making a polycarbonate resin with good melt stability.

TABLE 4

| Composition | % TV | Fe ppm | TEA ppm | Cl ppm | Mw | Mn |
|---|---|---|---|---|---|---|
| Example A | 0.05 | 0 | 0 | 0.12 | 31,105 | 7,523 |
| Example B | 0.13 | 0.03 | 0 | 3.1 | 29,978 | 6,842 |

Process Optimization

The process parameters of the tubular reactor were varied to determine their effect on the amount of chain silicone extension (i.e. E-E linkages) in 60% D45 block copolymers. Three parameters were varied: the start time of the tubular reactor relative to the amount of phosgene in the batch reactor, the molar ratio of phosgene to D45 in the tubular reactor, and the addition rate of material from the tubular reactor into the batch reactor.

For the start time, three different start times were used: early (1% phosgene added), medium (3% phosgene added), and late (10% phosgene added).

Two molar ratios of phosgene to D45 were used: low (7) and medium (11).

Three siloxane/$CH_2Cl_2$ solution addition rates to the tubular reactor were used: low (660 grams/min), medium (875 grams/min), and high (1,000 grams/min).

Table 5 shows 15 different processes, their resulting distribution of linkages, and some observations on the film properties. The wt % E-E plus wt % E-B will not always equal the siloxane linkage wt % due to rounding.

TABLE 5

| Batch Number | Start Time | Molar Ratio phosgene/D45 | Addition Rate | Wt % E-E | Wt % E-B | siloxane linkage wt % | Film Observation |
|---|---|---|---|---|---|---|---|
| 633 | med | med | med | 9 | 50 | 58.4 | translucent, slippy, elastomer |
| 635 | med | med | med | 12 | 53 | 64.4 | translucent, slippy, elastomer |
| 637 | med | med | med | 11 | 54 | 64.8 | translucent, slippy, elastomer |
| 639 | med | med | med | 11 | 54 | 64.5 | translucent, slippy, elastomer |
| 640 | late | med | med | 16 | 48 | 64.3 | opaque, slippy, elastomer, some delamination |
| 642 | late | med | med | 15 | 50 | 65.2 | opaque, slippy, elastomer, some delamination |
| 644 | early | low | med | 5 | 60 | 65.1 | slight haze, grippy, elastomer |
| 645 | early | low | slow | 8 | 56.7 | 64.2 | translucent, slippy, elastomer |
| 646 | early | low | slow | 11 | 53 | 64.0 | translucent, slippy, elastomer |
| 647 | early | low | fast | 4 | 61 | 64.7 | slight haze, grippy, elastomer |
| 649 | early | low | fast | 5 | 69 | 64.9 | slight haze, grippy, elastomer |
| 651 | early | low | fast | 3 | 62 | 65.0 | very low haze, grippy, elastomer |
| 654 | early | low | fast | 3 | 62 | 64.6 | very low haze, grippy, elastomer |
| 656 | early | low | fast | 3 | 61 | 64.2 | very low haze, grippy, elastomer |
| 658 | early | low | fast | 3 | 62 | 64.6 | very low haze, grippy, elastomer |

Based on these results, the following conclusions were made. First, for the fewest E-E linkages and highest clarity in the resulting block copolymer, it was best to start the tubular reactor cycle early, use a low phosgene to D45 molar ratio, and add the D45 bischloroformate to the batch reactor at a fast rate (Batches 647-658). It should be noted that the rate of addition of phosgene to the batch reactor was significantly decreased while the tubular reactor was operating to minimize depletion of bisphenol-A in forming B-B linkages and ensure that E-B linkages were favored over E-E linkages. After the siloxane material was completely added from the tubular reactor, the rate of addition of phosgene to the batch reactor was then increased to complete the reaction.

When considering the ratio of wt % E-B to wt % E-E, the "better" copolymers had a high ratio ranging between 10 and 40.

Table 6 shows the measured properties of some of the copolymers described in Table 5. Those properties were measured on pressed films of ~1 mm thickness. Percent transmission (% T) is a measure of light passing through an object. Percent haze (% H) is a measure of the scattering of light as it passes through a sample. Although higher haze materials are useful in some applications, a % H below 10 is preferred; haze less than 5% is more preferred. % T and % H are measured as per ASTM D1003. YI is the yellowness index, a color measurement, as per ASTM D6290.

TABLE 6

| Batch Number | Mw | % T | % H | YI | wt % E-E | wt % E-B | E-B/E-E ratio |
|---|---|---|---|---|---|---|---|
| 647 | 33,822 | 88.8 | 10.0 | 5.2 | 3.7 | 60.9 | 16.5 |
| 649 | 33,645 | 89.9 | 12.1 | 4.6 | 4.6 | 60.3 | 13.1 |
| 651 | 44,149 | 91.4 | 4.1 | 2.7 | 3.3 | 61.7 | 18.7 |
| 654 | 33,144 | 89.0 | 2.8 | 2.4 | 2.6 | 62.0 | 23.8 |
| 656 | 35,147 | 91.5 | 7.0 | 2.4 | 3.2 | 61.0 | 19.1 |
| 658 | 38,177 | 91.6 | 2.8 | 2.6 | 2.7 | 61.9 | 22.9 |

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A silicone polycarbonate elastomeric block copolymer prepared by the reaction of:
   60 to 70 weight percent of at least one difunctional phenolic terminated polydiorganosiloxane having from 30 to 50 organosiloxane repeat units,
   30 to 40 weight percent of at least one bisphenol containing from 6 to 36 carbon atoms, and
   a carbonate precursor;
   wherein less than 10% of the carbonate linkages formed by the carbonate precursor are between phenolic terminated polydiorganosiloxanes as determined by $^{13}$C NMR; and
   wherein the block copolymer has at least 30% elongation before yield as measured by ASTM D638; a % T of 70% or greater, and a haze level of 10% or less, when measured at 1.0 mm thickness according to ASTM D1003; a yellowness index of 10 or less, when measured according to ASTM D6290; and a Shore D hardness of from 5 to 20 as measured by ASTM D2240.

2. A silicone polycarbonate elastomeric block copolymer prepared by the reaction of:
   50 to 90 weight percent of at least one difunctional phenolic terminated polydiorganosiloxane having from 5 to 50 organosiloxane repeat units,
   10 to 50 weight percent of tetrabromo bisphenol-A; and
   a carbonate precursor;
   wherein less than 20% of the carbonate linkages formed by the carbonate precursor are between phenolic terminated polydiorganosiloxanes as determined by $^{13}$C NMR; and
   wherein the block copolymer has at least 30% elongation before yield as measured by ASTM D638.

3. A method of preparing a silicone polycarbonate elastomeric block copolymer containing (a) from 50 to 90 weight percent of at least one difunctional phenolic terminated polydiorganosiloxane having from 5 to 50 organosiloxane repeat units and (b) from 10 to 50 weight percent of at least one bisphenol containing from 6 to 36 carbon atoms, wherein less than 20% of the carbonate linkages formed by the carbonate precursor are between phenolic terminated polydiorganosiloxanes as determined by $^{13}$C NMR, and wherein the block copolymer has at least 30% elongation before yield as measured by ASTM D638, the method comprising:
   reacting a reaction mixture containing the at least one bisphenol and the carbonate precursor to form polycarbonate blocks; and
   adding the difunctional phenolic terminated polydiorganosiloxane to the reaction mixture with additional carbonate precursor to react with the polycarbonate blocks and form the silicone polycarbonate elastomeric block copolymer;
   wherein the reacting and adding occur over a total period of from 30 minutes to about 60 minutes.

* * * * *

UNITED STATES PATENT AND TRADEMARK OFFICE
CERTIFICATE OF CORRECTION

PATENT NO. : 8,466,249 B2  
APPLICATION NO. : 13/107046  
DATED : June 18, 2013  
INVENTOR(S) : Robert R. Gallucci et al.

Page 1 of 1

It is certified that error appears in the above-identified patent and that said Letters Patent is hereby corrected as shown below:

Title Page, Item (75) Inventors, should read

-- Robert R. Gallucci, Mt. Vernon, IN (US);
James Franklin Hoover, Evansville, IN (US);
Paul Dean Sybert, Evansville, IN (US) --

Signed and Sealed this
Third Day of September, 2013

Teresa Stanek Rea
*Acting Director of the United States Patent and Trademark Office*